Nov. 10, 1970  D. W. DANFORTH  3,538,749
CONTROL FOR FREENESS TESTER

Filed March 6, 1969

INVENTOR
DONALD W. DANFORTH
BY
Pearson + Pearson
ATTORNEYS

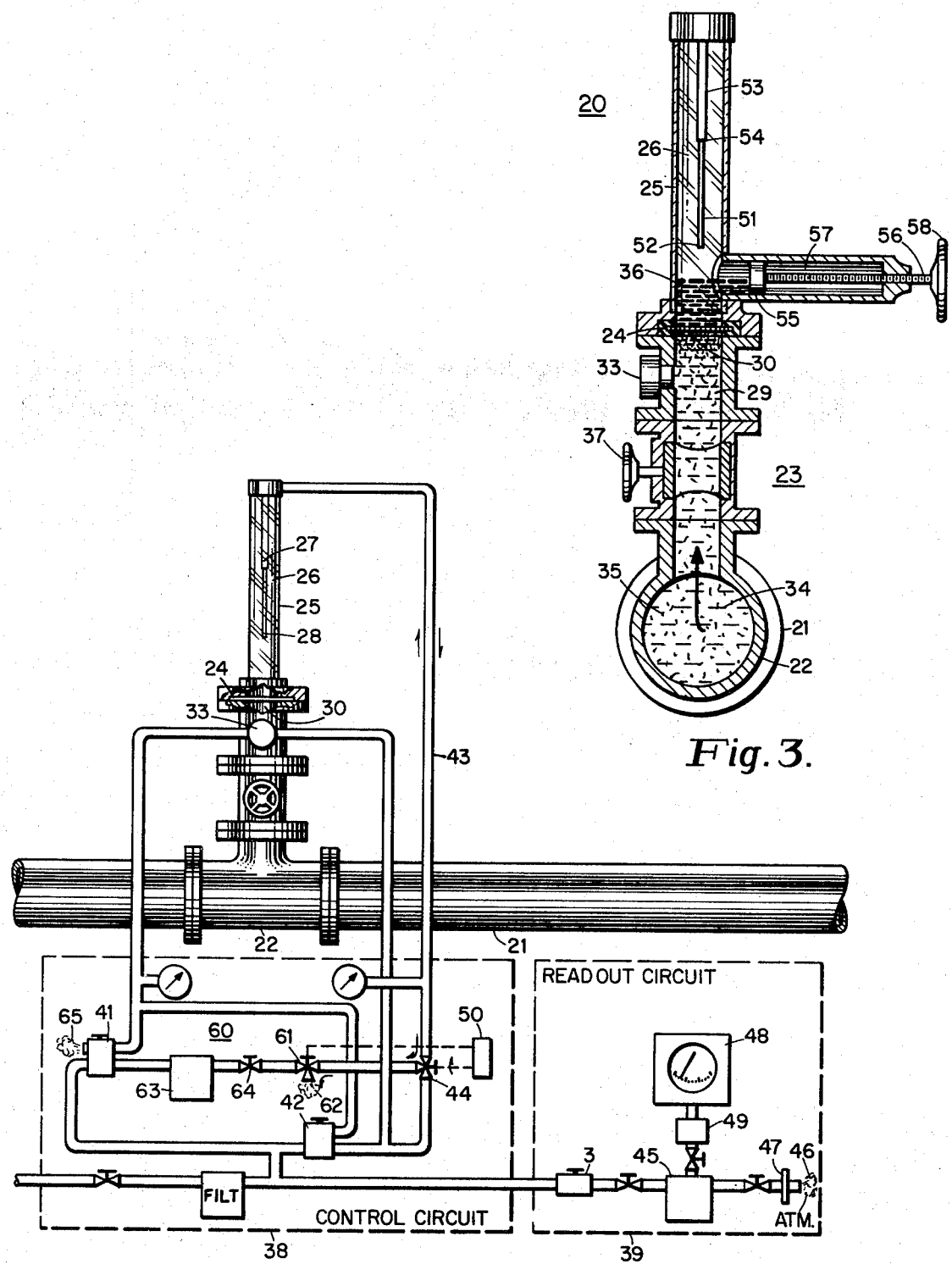

United States Patent Office 3,538,749
Patented Nov. 10, 1970

3,538,749
CONTROL FOR FREENESS TESTER
Donald W. Danforth, Andover, Mass., assignor to Bolton-Emerson, Inc., Lawrence, Mass., a corporation of Massachusetts
Filed Mar. 6, 1969, Ser. No. 804,884
Int. Cl. G01n 33/34
U.S. Cl. 73—63            10 Claims

ABSTRACT OF THE DISCLOSURE

A paper stock freeness tester of the automatic, closed stock line, standpipe type, periodically admitting, screening and discharging to measure stock drainage rate, has an electro-pneumatic system to compensate for stock line pressure variation and maintain influent stock velocity at zero at the screen. It also has with adjustable electro-pneumatic means to convert drainage rate directly and linearly to time interval and has adjustable means to vary the volume of the filtrate chamber.

BACKGROUND OF THE INVENTION

The apparatus of this invention is an improved control system for use in the freeness tester fully described in my U.S. Pat. 3,186,215 of June 1, 1965, the said tester being now well known in the trade as the "Drainac" of Bolton-Emerson, Inc., Lawrence, Mass.

As disclosed in the said patent, Freeness Testers of this type comprise a closed end standpipe divided by a screen into a stock intake chamber and a filtrate chamber, the standpipe forming part of a closed paper stock line. Suitable well known electrical and pneumatic circuits and instrumentation are provided to automatically and periodically cause paper stock to rise in the intake chamber, form a fibrous mat on the screen and pass filtrate through the screen into the filtrate chamber where the level attained is sensed and recorded. The filtrate, mat and stock are then blown downwardly back into the stock line in readiness for the next test in the cycle.

As mentioned in U.S. Pat. 3,368,392 to Miller of Feb. 13, 1968, disclosing a Freeness Tester of the type herein but with a filtrate chamber of non-uniform cross section, an increase in sensitivity of such testers is desirable. It is also desirable to increase accuracy by avoiding error due to stock rise velocity in high pressure lines or stock rise slowness in low pressure lines. It has further been found desirable to increase sensitivity and accuracy by measuring time interval of rise in the filtrate chamber and to be able to vary the volume of the filtrate chamber for the purpose of adjustment to slow or fast stocks, high or low line pressures and other variable factors found in stock systems.

In the drawing:

FIG. 3 is a front elevational view, similar to FIG. 1, turned through and showing the variable volume reservoir; and FIG. 4 is a fragmentary view similar to FIG. 1 showing a modification of the invention.

Figure 1:
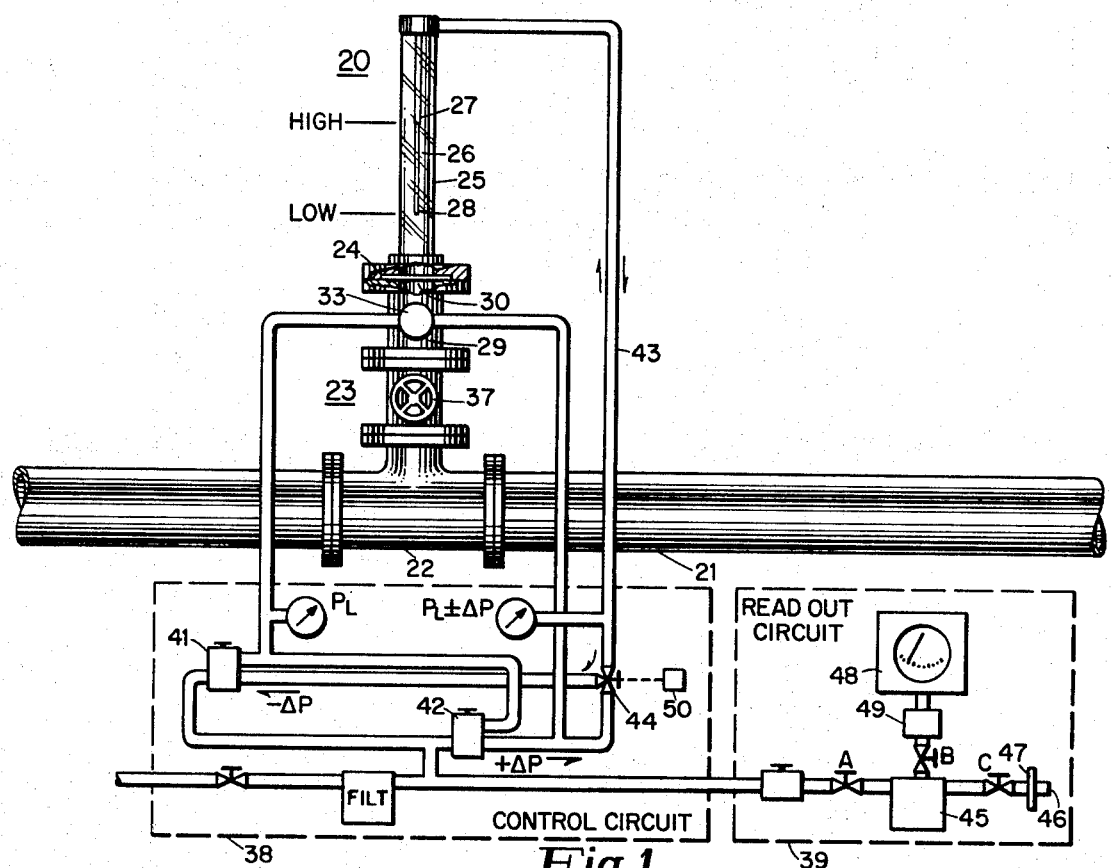
FIG. 1 is a somewhat diagrammatic side elevational view, partly in section of a freeness tester standpipe constructed and controlled in accordance with the invention.

As illustrated in FIG. 1, the detector 20 is mounted directly in the stock pipeline 21, immediately following the refiner(s), thereby avoiding sampling lines or transport delays of any kind. The detector 20, which is totally enclosed and involves no moving parts, consists of a T 22 (the horizontal part of which is the same diameter as the existing stock line) with a 4" diameter vertical branch or standpipe 23, partitioned by a screen 24. The screen 24 is surmounted by a transparent tube 25 into which the filtrate flows. Within the filtrate chamber 26 of the tube are two conductance probes 27 and 28 for filtrate level detection. A stock intake chamber 29 is formed on the upstream side 30 of screen 24.

The basic function of detector 20 is to measure the rate of filtrate accumulation, utilizing the principle of constant pressure filtration. Accordingly, a pressure transmitter 33 constantly monitors stock line pressure and biases two control pressures. The instrument functions in a cyclic fashion by establishing alternately pre-set negative and positive differential pressures within the tube, with respect to line pressure. As air is allowed to escape from the tube 25, stock 34 will move up the vertical branch, fibers 35 will form a pad at the screen 24, enabling the establishment of a negative $\Delta P$, and water or filtrate 36 will flow into the filtrate chamber 26. When the rate of water flow through the fiber pad has been determined, a positive pressure differential is established introducing air into the tube to force filtrate and fibers back into the pipeline in preparation for the next sample. Thus, the detector 20 cycles automatically, each cycle requiring one to two minutes depending upon system specifics. Drainage rate is sensed by measuring the interval of time required to collect a predetermined volume of filtrate 36 in the filtrate chamber 26. A valve 37 is provided to isolate the detector 20 should servicing be required.

Specifically, two sub-systems are involved: the stock line pressure monitoring means or control circuit 38, and the readout circuit 39. The control circuit 38 utilizes the conventional diaphragm type pressure transmitter 33 to continuously monitor stock line pressure and bias two differential pressure regulators 41 and 42, the outputs of which are connected to the top of the filtrate tube via conduit 43 and a three-way solenoid valve 44. One differential pressure regulator 41 is adjusted to provide negative $\Delta P$ with respect to stock line pressure and, thus, exhaust air from the filtrate chamber 26, causing stock 34 to move upward. When the stock 34 encounters the screen 24, the fibers 35 are retained, forming a pad, and water 36 passes through under the influence of the pre-set pressure differential. When the filtrate level reaches the upper probe 27, the three-way valve 44 is switched to the other differential pressure regulator 42 (which is adjusted to provide a positive $\Delta P$ with respect to stock line pressure) and, thus, air is introduced into filtrate chamber 26, forcing water 36 and fibers 35 down the intake chamber 29 into the main line 21. At the expiration of a pre-set interval of time, the three-way valve 44 is switched back to the negative $\Delta P$ regulator 41, and the control cycle repeats.

Drainage rate is read out by measuring the interval of time required to collect a predetermined volume of water 36 in the filtrate chamber 26. The timing means of the invention utilizes two probes, 27 and 28, in the filtrate chamber 26 in conjunction with a small pressure tank 45 in the instrument cabinet. The time tank 45 is pressurized to a predetermined level during detector blowdown. When the incoming filtrate 36 contracts the lower probe, the tank 45 is vented to atmosphere 46 through a restriction 47, thus pressure in the tank becomes a function of time; i.e., the longer the vent 47 is open, the lower the pressure in the tank 45. When the filtrate 36 contacts the upper probe 27, the tank 45 is isolated and the pressure at that moment is transferred to the 3–15 p.s.i. recorder 48, whereupon the recorder 48 is isolated until the next cycle. By means of a small reservoir 49 (the size of which can be selected according to the situation), the readings can reflect instantaneous variations or the signal can be buffered to indicate trends.

This time/pressure relationship is, of course, exponential. Necessarily, the rate of rise of filtrate 36 in the tube chamber 26 is exponential. Interestingly, the most common method of laboratory determination of stock drainage rate, the Canadian Standard Freeness Test, is also exponential. As a result, fortuitously, it develops that the relationship between detector 20 and Canadian Standard Freeness (CSF) is substantially linear.

Essentially, the CSF Tester utilizes a liter chamber, the bottom of which consists of a screen identical to that used in detector 20. A stock sample comprising 3 grams of fibers in a liter is introduced. As water passes through the screen, fibers are deposited on the screen, thus slowing the rate of water flow. Rate is measured as that volume of drainage water (expressed in cc.) which passes a fixed orifice; thus, a reading of 700 represents relatively "free" stock, while smaller numbers designate "slower" stocks.

Figure 2:
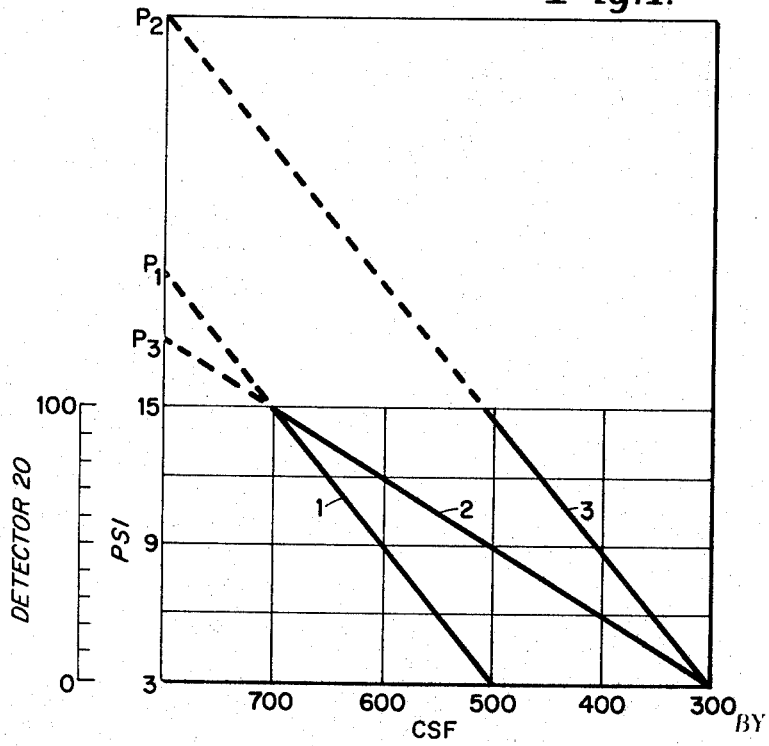
FIG. 2 is a correlation chart.

The time/pressure arrangement of detector 20 is very versatile in that virtually any combination of range and sensitivity can be accommodated by proper sizing of tube diameter (i.e. filtrate volume) and suitable adjustments in tank initial pressure and vent orifice size. It is preferred that adjustments be made such that the freest anticipated condition (i.e., fastest draining) corresponds to recorder chart full scale and the slowest anticipated condition to chart zero. (For illustrative purposes, these relationships are graphically illustrated in FIG. 2.) Line 1 depicts the correlation using a relatively low tank initial pressure; full scale, 700 CSF: zero, 500 CSF. Line 2 depicts the correlation using the same restriction (thus, the same slope) and a higher initial pressure: full scale, 500 CSF; zero, 300 CSF. Line 3 depicts the correlation using a smaller restriction (thus, a slower slope) and a low initial pressure: full scale, 700 CSF; zero, 300 CSF.

Changes in stock temperature do not have a profound effect on detector 20 readout. It appears that the explanation for this lies in the fact that, whereas higher temperature water has a lower viscosity and thus should drain faster, the fibers also react to temperature and, in a higher temperature environment, fibers become softer and pack more densely, thus forming a more effective resistance. Fortuitously, these two effects virtually cancel each other, and, thus, the indication of detector 20 is, for most practical purposes, insensitive to normal stock temperature variations. Similarly, errors due to variations in stock consistency are relatively small in comparison to the effect due to stock drainage, and, in the practical sense, can usually be considered insignificant.

The presence of filler (inert non-fibrous additives) has a significant effect on the standard laboratory freeness determination. Since a standard weight of solids is specified for the test, if a percentage of that weight is filler (which constitutes virtually no drainage resistance), the weight of fiber is reduced accordingly and, thus, drainage resistance is reduced. It can be argued that the manual determination is erroneous in such a situation since there is less than the standard weight of fiber present. In any event, detector 20 measures drainage rate of the fiber, virtually independent of filler concentration.

Detector 20 provides, in effect, a continuous measurement of stock drainage rate. Since those fiber characteristics which determine sheet quality (i.e., fiber size, shape, flexibility, etc.) also affect stock drainage properties, for a given situation, the detector 20 reflects the relative condition of the fibers and, consequently presages the quality of the finished paper. Thus detector 20 produces "instant quality," before the sheet is formed, enabling compensation for the many variables inherent in the papermaking process.

50 is a cycle control unit, which operates automatically, each cycle requiring one to two minutes depending on the settings of the system.

As shown in FIG. 3, the transparent hollow tube of standpipe 23, which defines the filtrate chamber 26 is adjustable in volume downstream of the screen 24 to produce a variation in column height when desired for a given volume of filtrate. The filtrate level sensing device which is preferred is an inner electric probe 51, having a terminal tip 52 which senses one level and an outer electric probe 53 having a terminal tip 54 which senses another level of filtrate. It is desirable to collect a substantial volume of filtrate above the screen before engaging the probes in order to get out on the more linear part of the height-time curve without increasing tube height unduly and to then permit the final portion of the filtrate to rise in a tube of less volume to provide a more accurate reading. As shown in FIG. 3, the tube 23 is provided with a wall section 55 which is movably mounted in the manner of a piston head to move with threaded rod 56 in the reservoir 57 to produce a "coarse" setting or a "fine" setting selectively as desired. A hand wheel 58, or automatic means, is provided for moving rod 56 and wall section 55 to the desired location, and holding the same in position.

The time-pressure arrangement disclosed herein is versatile in that virtually any combination of range and sensitivity can be accommodated by proper sizing of the filtrate chamber 26 (see FIG. 3) and by suitable adjustments in initial pressure of the time tank and suitable adjustments of the vent orifice size. By virtue of the filtrate chamber volume control, time interval measurement control and vertical velocity intake chamber control of this invention, the tester is adjustable so that the fastest draining stocks correspond to full scale on recorder chart 48, the slowest anticipated conditions correspond to zero on chart 48 and regardless of stock line pressure, velocity at the upstream side 30 of screen 24 is constant and maintained at substantially zero.

In the device of my said Pat. 3,186,215, air exhaust to atmosphere by a cycle timer permitted paper stock to rise in intake chamber 29 at a velocity dependent on high or low line pressure and wide variations in stock line pressure tended to affect the formation of fibres on the screen and the velocity of filtrate passing through the screen. As shown in FIG. 4, in this invention stock velocity control apparatus 60 is preferably provided to continually compensate for variations in line pressure, this being accomplished by controlling the rate of air exhaust from filtrate chamber 26 through line 43 to an atmospheric orifice. It appears that the condition of the stock as it enters intake chamber 29, and encounters the upstream side 30 of screen 24 is time dependent. Stock at low pressure rises relatively slowly affording time for fibres to separate and forms a pad slowly on the screen 24, resulting in greater resistance and formation of a more dense pad which ultimately results in a slower reading. Conversely stock at higher pressure rises at a faster rate, the pad is frozen in position rapidly, resulting in less resistance, a less dense pad and consequently a freer reading on chart 48.

In this invention, influent flow to fill the intake chamber is relatively fast with the pneumatic resistance at atmospheric or negative pressure, independent of stock line pressure, but upon stock reaching the level of the upstream side 30 of screen 24, constant pneumatic resistance is established so that mat, or pad, formation and filtration take place more slowly at a controlled rate, thus producing constant chart readings independent of stock line pressure.

Upon initiation of intake in each testing cycle, by cycle control unit 50 a second three way solenoid valve 61 is positioned to exhaust air in tester 20 to atmosphere orifice 62 thus enabling stock to rise swiftly in intake chamber 29. Just before stock encounters screen 24 control unit 50 shifts valve 61 to close off connection to atmosphere 62 and to connect the line 43 to a fluid pressure tank 63. Tank 63 has been pre-pressurized with reference to stock line pressure by pressure controller 41. Air thus moves from tester 20 into tank 63, which acts as a reservoir and buffer, the air passing from valve 61 through restrictor valve 64, pressurized surge tank 63 and thence to controller 41 and out to atmosphere 65.

The sample is taken from line 21 and delivered to the upstream side 30 of screen 24 in about ten seconds thus avoiding opportunity for stratification, yet the pressure differential is established in a slow controlled manner so that pad density is unaffected by variations in stock line pressure. Valve 61 isolates tank 63 during blow-down, so that its accumulated pressure can be re-adjusted to receive the next intake, by the pressure controller 42. The desired pre-pressurization of tank 63 is established and maintained by pressure controllers 41 and 42, in accordance with the stock pressure in the stock line 21.

What is claimed is:

1. In an automatic freeness tester of the type having a closed standpipe connected into a closed paper stock line, said standpipe being divided by a screen into a stock intake chamber and a filtrate chamber, and having drainage rate measurement means operably connected therewith for periodically admitting paper stock into said intake chamber to form a fibrous mat on said screen while filtrate passes into said filtrate chamber and then discharging said fibrous mat and filtrate back into said stock line, the combination of stock line pressure monitoring means, operably connected to said stock intake chamber for controlling differential pressure across said screen to provide constant stock pressure at the upstream side of said screen, and timing means, forming part of said drainage rate measurement means and operably connected to said filtrate chamber for measuring the interval of time required to collect a predetermined volume of filtrate in said filtrate chamber to indicate the drainage rate of said paper stock.

2. A combination as specified in claim 1 wherein:

said stock line pressure monitoring means includes stock pressure sensing means associated with said intake chamber and air exhaust control means associated with said filtrate chamber, and responsive to said stock pressure sensing means for rapidly admitting stock into said intake chamber up to the level of said screen while said filtrate chamber is connected to atmospheric exhaust and then connecting said filtrate chamber to a fluid tank, having a fluid pressure maintained constant by said monitoring means, to permit filtering through said screen under controlled differential pressure at substantially zero vertical velocity of stock in said intake chamber.

3. A combination as specified in claim 1, wherein:

said timing means includes a pre-charged fluid pressure tank; discharge valve means on said tank and electric control means operably connected to said valve means for causing said tank to discharge fluid while filtrate rises in said filtrate chamber from one predetermined level to a second predetermined level, the loss in pressure in said tank correlating with the time interval of said discharge to indicate the freeness of said paper stock.

4. In a freeness tester of the closed standpipe type, said tester periodically admitting paper stock from a stock line into an intake chamber to form a fibrous mat on a screen while filtrate rises in a filtrate chamber and then discharging said filtrate and fibrous mat back into said stock line, the combination of:

level sensing means in said filtrate chamber for sensing change of filtrate height from one level to another level therewithin and timing means, responsive to said level sensing means, for measuring the time interval required to accomplish said change of height, said time interval thereby indicating freeness, or drainage rate, of said paper stock.

5. A freeness tester as specified in claim 4 wherein:

said timing means includes a pre-charged fluid pressure tank having a valve connection to exhaust said tank to atmosphere and valve control mechanism actuated by said level sensing means to open said valve at said one filtrate level and close said valve at said another filtrate level.

6. A freeness tester as specified in claim 4:

plus a section of said standpipe movably mounted and forming a part thereof defining said filtrate chamber, and means for moving said section to vary the volume of said chamber for increasing or decreasing the time required to collect filtrate therein.

7. In apparatus for testing the freeness of paper stock, said apparatus being of the type comprising a standpipe having an open lower end, a screen mounted therein for separating fibers from liquid in the paper stock, means attached to the upper end of said standpipe to allow the escape of compressed air therefrom during the inflow of paper stock thereinto, and means for measuring the rate of liquid rise above said screen, the improvement comprising:

means for controlling the rate at which air is exhausted from said standpipe on admission thereto of liquid from the paper stock.

8. The apparatus defined in claim 7 wherein said means for controlling the rate at which air is exhausted from said standpipe comprises a pressurized surge tank in the air exhaust line.

9. The apparatus as defined in claim 8 wherein said means for controlling the rate at which air is exhausted from said standpipe additionally comprises a restrictor valve.

10. Apparatus as defined in claim 7 comprising additionally a variable volume chamber on the downstream side of said screen.

References Cited

UNITED STATES PATENTS

| | | | |
|---|---|---|---|
| 2,734,378 | 2/1956 | Meyers | 73—63 |
| 3,144,763 | 8/1964 | Mayo | 73—63 |
| 3,186,215 | 6/1965 | Danforth | 73—63 |
| 3,368,392 | 2/1968 | Miller | 73—63 |

LOUIS R. PRINCE, Primary Examiner

J. W. ROSKOS, Assistant Examiner

U.S. Cl. X.R.

137—92; 162—198